United States Patent [19]

Ishikawa et al.

[11] Patent Number: 5,557,494
[45] Date of Patent: Sep. 17, 1996

[54] DRIVE CIRCUIT OF AN ELECTROMAGNETIC DEVICE

[75] Inventors: Minoru Ishikawa; Kimitada Ishikawa, both of Kawasaki, Japan

[73] Assignee: Fuji Electric Co., Ltd., Kawasaki, Japan

[21] Appl. No.: 297,548

[22] Filed: Aug. 31, 1994

[30] Foreign Application Priority Data

Sep. 7, 1993 [JP] Japan .................. 5-221505

[51] Int. Cl.⁶ .................. H01H 47/04
[52] U.S. Cl. .................. 361/152; 361/154
[58] Field of Search .................. 361/152–155, 361/159; 123/490

[56] References Cited

U.S. PATENT DOCUMENTS

| | | | |
|---|---|---|---|
| 4,947,283 | 8/1990 | Kono | 361/154 |
| 5,134,537 | 2/1992 | Buss et al. | 361/154 |
| 5,341,032 | 8/1994 | Brambilla et al. | 361/154 X |

*Primary Examiner*—Fritz M. Fleming
*Attorney, Agent, or Firm*—Spencer & Frank

[57] ABSTRACT

A drive circuit of an electromagnetic contactor including a series circuit of a surge absorber and a diode connected in parallel with the coil of the contactor, and a transistor connected in parallel with the surge absorber. There are two operation modes. In a first operation mode, the contactor is opened immediately after the contactor has been closed by a starting pulse. In a second operation mode, the contactor is opened after the contactor has been closed by a starting pulse and held by holding pulses following the starting pulse. In the first operation mode, the transistor is kept in an on state for a delay time after starting the contactor. This prevents the current due to counter electromagnetic force of the coil from flowing through the surge absorber before the current is reduced below the allowable level of the surge absorber by the transistor. This makes it possible to protect the surge absorber from being overheated. In the second operation mode, the transistor is turned off immediately after the DC power supply is removed. This makes it possible to open the contactor with little delay.

7 Claims, 9 Drawing Sheets

FIG. 2 (A) SWITCH 9 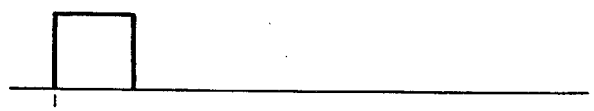
FIG. 2 (B) OUTPUT OF OSCILLATOR 3 
FIG. 2 (C) CURRENT $I_1$ OF COIL 1 
FIG. 2 (D) CURRENT $I_2$ OF TRANSISTOR 6 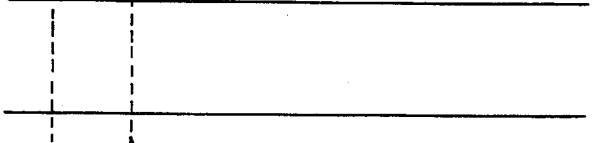
FIG. 2 (E) CURRENT i OF SURGE ABSORBER 4 
TIME → t
PRIOR ART

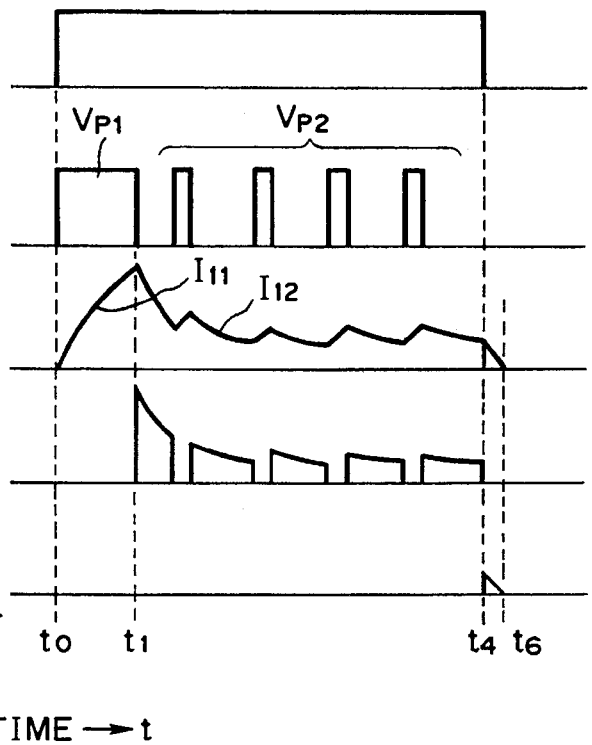
FIG. 3 (A) SWITCH 9
FIG. 3 (B) OUTPUT OF OSCILLATOR 3
FIG. 3 (C) CURRENT I₁ OF COIL 1
FIG. 3 (D) CURRENT I₂ OF TRANSISTOR 6
FIG. 3 (E) CURRENT i OF SURGE ABSORBER 4
TIME → t
PRIOR ART

PRIOR ART

FIG. 6 (A) SWITCH 9

FIG. 6 (B) OUTPUT OF OSCILLATOR 3

FIG. 6 (C) CURRENT I₁ OF COIL 1

FIG. 6 (D) CURRENT I₂ OF TRANSISTOR 6

FIG. 6 (E) CURRENT i OF SURGE ABSORBER 4

TIME → t

PRIOR ART

FIG. 8 (A) SWITCH 9

FIG. 8 (B) OUTPUT OF OSCILLATOR 3

FIG. 8 (C) OUTPUT OF OR GATE 81

FIG. 8 (D) OUTPUT OF INVERTER 85

FIG. 8 (E) OUTPUT OF AND GATE 86

FIG. 8 (F) CURRENT $I_1$ OF COIL 1

FIG. 8 (G) CURRENT $I_2$ OF TRANSISTOR 6

FIG. 8 (H) CURRENT $i$ OF SURGE ABSORBER 4

TIME → t

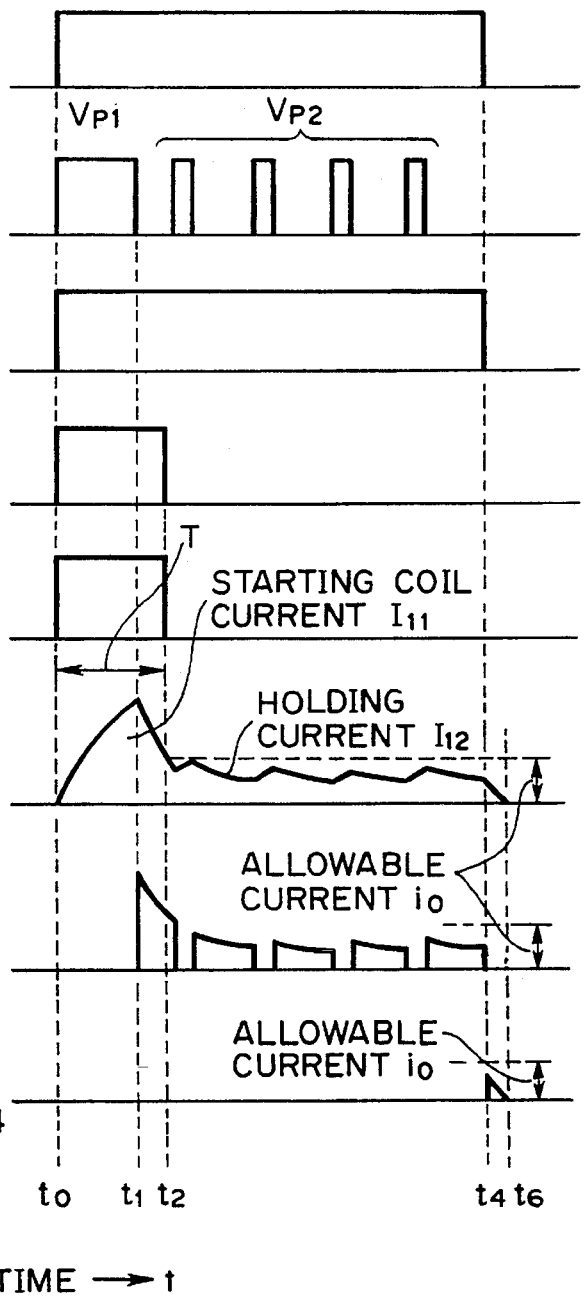

DRIVE CIRCUIT OF AN ELECTROMAGNETIC DEVICE

BACKGROUND OF THE INVENTION

1. Field of the Invention

The present invention relates to a drive circuit of an electromagnetic device for turning on and off an electromagnetic contactor or the like.

2. Description of Related Art

An electromagnetic contactor is turned on or off by energizing or deenergizing a coil wound on a steel core of the contactor, thereby attracting or releasing its armature. It is preferable that a drive circuit for such an electromagnetic device be small and inexpensive, and its attracting and releasing times be short. Thus, a conventional electromagnetic device is known whose coil is provided with a free-wheeling circuit.

FIG. 1 shows a conventional drive circuit of an electromagnetic device for use with such an electromagnetic contactor. In FIG. 1, a coil 1, which is wound on a steel core not shown in this figure, is serially connected to the collector of a transistor 2. The base of the transistor 2 is connected to the output of a rectangular wave oscillator 3, and the emitter thereof is connected to one end of the oscillator 3. A serial circuit of a surge absorber 4 and a diode 5 is connected in parallel with the coil 1, and the surge absorber 4 is connected in parallel with the collector and emitter of a transistor 6. The serial circuit of the coil t and the transistor 2 is connected to a DC power supply 10 through a serial connection of diodes 71 and 72 and a switch 9. The base of the transistor 6 is connected to the connecting point of the diode 72 and the switch 9 through a resistor 73. The diodes 71 and 72, and the resistor 73 constitute a control circuit 7A of the transistor 6.

The operation of the drive circuit of the electromagnetic device is roughly divided into two operation modes. In a first operation mode, the switch 9 is opened immediately after the switch 9 and the contactor are closed. In a second operation mode, the switch is opened after the contactor is closed and then enters into a holding state.

FIGS. 2(A)–2(E) illustrate the operation in the first operation mode. The switch 9 is closed at time $t_0$, and is opened again at time $t_1$ immediately after time $t_0$ as shown in FIG. 2(A). Closing the switch 9 at time $t_0$ as shown in FIG. 2(A) impresses the voltage $E_1$ of the power supply 10 across the series circuit of the coil 1 and the transistor 2, and the rectangular oscillator 3, through the two diodes 71 and 72. The oscillator 3 produces a starting pulse $V_{p1}$ as shown in FIG. 2(B), and the coil 1 is energized by a starting coil current $I_{11}$ as shown in (C) of FIG. 2(C). No current flows through the transistor 6 as shown in FIG. 2(D) because the diode 5 is reverse biased from time $t_0$ to time $t_1$, and the switch 9 is opened at time $t_1$. Accordingly, the counter electromotive force generated by the coil 1 due to opening of the switch 9 at time $t_1$ is impressed entirely across the serial circuit of the diode 5 and the surge absorber 4, and a rather large current i flows through the surge absorber 4 as shown in FIG. 2(E).

FIGS. 3(A)–3(E) illustrate the operation in the second operation mode. In this operation mode, the switch 9 is opened at time $t_4$ after the contactor has entered into a holding mode. At time $t_0$, the switch 9 is closed as shown in FIG. 3(A). Because switch 9 was closed, the oscillator 3 provides the base of the transistor 2 with a rectangular pulse voltage $V_p$ consisting of a wide width starting pulse $V_{p1}$ and successive narrow width holding pulses $V_{p2}$. Accordingly, a coil current $I_1$ flows through the coil 1, thereby attracting the armature. In this case, a current due to the counter electromotive force of the coil 1 begins to flow through the transistor 6 at time $t_1$ because the voltage drop across the two diodes 71 and 72 provides a forward bias to the transistor 6. Therefore, during intervals at which the pulse voltage $V_p$ is not applied to the transistor 2, the electromagnetic energy stored in the coil 1 flows through the transistor 6 as an electric current $I_2$ as shown in FIGS. 3(D). Thus, the current $I_1$ flowing through the coil 1 is the sum of the current supplied from the power supply 10 and the current $I_2$.

When the switch 9 is opened at time $t_4$, the voltage $E_1$ of the power supply 10 and the output of the oscillator 3 are removed, and the transistor 6 is turned off. Thus, the current $I_2$ is stopped. The electromagnetic energy stored in the coil 1 will flow as a current i through the diode 5 and the surge absorber 4. Since the surge absorber 4 has a large resistance, the current i rapidly attenuates, and the armature is released at time $t_6$, thereby opening the electromagnetic contactor.

The conventional drive circuit of an electromagnetic device has a problem in the first operation mode, in which the switch 9 is closed at time $t_0$, and opened again at time $t_1$ immediately after the wide width starting pulse $V_{p1}$ is applied from the oscillator 3 to the base of the transistor 2 as shown in FIGS. 2(A) and 2(B). In this case, a rather large current $I_1$ flowing through the coil 1 (hereinafter referred to as a starting coil current $I_{11}$) immediately changes its passage to the surge absorber 4, through which it flows as the current i. As a result, the surge absorber 4 is overheated, and may sometimes suffer damage.

To overcome this problem, another conventional drive circuit of an electromagnetic device as shown in FIG. 4 is proposed. The drive circuit of FIG. 4 has a capacitor 74 connected in parallel with the serial connected diodes 71 and 72 of the control circuit 7A of the drive circuit of FIG. 1. The diodes 71 and 72, the resistor 73 and the capacitor 74 constitute a new control circuit 7B.

The operation of the drive circuit of the electromagnetic of FIG. 4 device will be explained referring to FIGS. 5(A)–5(E) and 6(A)–6(E). FIG. 5 illustrates the first operation mode, in which the switch 9 is closed at time $t_0$, and opened at time $t_1$ immediately after the wide width starting pulse $V_{p1}$ is supplied from the oscillator 3 to the base of the transistor 2, as in FIGS. 2(A)–2(E).

In FIGS. 5(A)–5(E), closing the switch 9 at time $t_0$ induces a voltage drop across the diodes 71 and 72, which charges the capacitor 74 of the control circuit 7B. Then, opening the switch 9 at time $t_1$ removes the voltage $E_1$ of the power supply 10 and the output of the oscillator 3 from the coil 1 and the base of the transistor 2, respectively. The transistor 6, however, continues the on-state due to the electric discharge of the capacitor 74 during a delay time T until the discharge ends as shown in FIG. 5(D). During the discharge, the coil current $I_1$ flows through the transistor 6 as the current $I_2$. The current $I_2$ gradually attenuates owing to the resistance of the transistor 6, and drops below the allowable current $i_0$ of the surge absorber 4 at time $t_3$ after the delay time T as shown in FIG. 5(D). At time $t_3$, the transistor 6 is turned off, and the current i below the allowable current $i_0$ flows through the surge absorber 4. The current i sharply decreases, the armature is released, and the electromagnetic contactor is opened. Thus, in the second conventional drive circuit of FIG. 4, since the current i flowing through the surge absorber 4 is limited below the allowable current $i_0$, the surge absorber 4 is prevented from being overheated or burned.

The second conventional drive circuit, however, delays the off timing of the transistor 6 connected in parallel with the surge absorber 4. The delay is effective in the first operation mode because the rather large coil current $I_1$ is reduced below the allowable current $i_0$ of the surge absorber 4 during the delay time T as shown in FIGS. 5(C) and 5(D). The delay, however, serves only to delay the operation of the contactor in the second operation mode.

FIGS. 6(A)–6(E) illustrate the second operation mode of the second conventional drive circuit as shown in FIG. 4. In the second operation mode, the switch 9 is opened after the contactor has entered into a holding mode, in which the contactor is held by holding pulses $V_{p2}$ outputted after the starting pulse $V_{p1}$ as shown in FIGS. 6(A)–6(C). The transistor 6 continues the onstate for the delay time T after the switch 9 is opened at time $t_4$. This serves only to delay the opening operation of the contactor because it is unnecessary to reduce the small holding current of the coil 1 in this case.

Since the frequency of the second operation mode is much higher than that of the first operation mode, the delay involved in the second operation mode is undesirable.

SUMMARY OF THE INVENTION

It is therefore an object of the present invention to provide a drive circuit of an electromagnetic device which can prevent overheating or burning of a surge absorber, and at the same time turn off a contactor without delay.

According to an aspect of the present invention, there is provided a drive circuit of an electromagnetic device having a coil, the drive circuit having a loop circuit including a DC power supply, a switch, the coil, and a first switching device, the drive circuit comprising:

- an oscillator whose output terminal is connected to the control terminal of the first switching device, the oscillator providing the first switching device with a starting pulse and holding pulses following the starting pulse, the starting pulse being generated when the switch is closed, and the width of the starting pulse being greater than the width of the holding pulses;
- a series circuit of a surge absorber and a diode, the series circuit being connected in parallel with the coil of the electromagnetic device in such a direction that the series circuit absorbs counter electromotive force of the coil;
- a second switching device connected in parallel with the surge absorber; and
- a control circuit keeping the second switching device conductive for a predetermined delay time after the switch is closed, the predetermined delay time being longer than the width of the starting pulse.

Here, the first switching device may be a first transistor, and the control terminal of the first switching device may be the base of the first transistor.

The second switching device may be a second transistor, and the control circuit may comprise:

- a one-shot pulse circuit generating a pulse in response to a closing of the switch, the width of the pulse being substantially equal to the predetermined delay time;
- an OR gate ORing the output of the one-shot pulse circuit and a signal representing the on-state of the switch; and
- a base current circuit controlling the second transistor in response to the output signal of the OR gate, the base current circuit turning off the second transistor after the predetermined delay time has elapsed when the switch is opened during the predetermined delay time, and turning off the second transistor immediately after the switch is opened when the switch is opened after the predetermined delay time.

The control circuit may comprise a photocoupler whose light emitting diode is connected to the output of the OR gate via a resistor, and whose phototransistor, which receives the light from the light emitting diode, is included in the base current circuit.

The collector of the first transistor may be connected to the coil and the emitter of the first transistor may be connected to the negative terminal of the DC power supply, and the collector of the second transistor may be connected to the collector of the first transistor through the diode and the emitter of the second transistor may be connected to the positive terminal of the DC power supply via the switch.

The base current circuit may comprise:

- a third transistor whose emitter is connected to the emitter of the second transistor and whose collector is connected to the base of the second transistor;
- a control DC power supply whose negative terminal is connected to the emitter of the third transistor, and whose positive terminal is connected to the collectors of the third transistor and the phototransistor via resistors, respectively; and
- a capacitor connected between the positive terminal and the negative terminal of the control DC power supply, wherein the emitter of the phototransistor is connected to the emitter of the third transistor and the collector of the phototransistor is connected to the base of the third transistor.

The one-shot pulse circuit may comprise:

- a series circuit of a resistor and a capacitor, the series circuit being connected to the output of the OR gate;
- an inverter whose input terminal is connected to the connecting point of the resistor and capacitor of the series circuit; and
- an AND gate whose first input terminal is connected to the output terminal of the OR gate and second input terminal is connected the output terminal of the inverter, the AND gate producing the output of the one-shot pulse circuit.

According to the present invention, the second transistor is kept conductive for the delay time after the switch is opened in the first operation mode. Accordingly, the coil current due to the counter electromotive force flows through the second transistor so that the coil current is reduced below the allowable current of the surge absorber before the coil current flows through the surge absorber. On the other hand, the second transistor is turned off immediately after the switch is opened in the second operation mode, and hence the contactor is opened without delay. In this case, although the coil current flows through the surge absorber immediately after the switch is opened, this causes no overheating or burning of the surge absorber, because the holding current is smaller than the starting current, and hence, the coil current flowing through the surge absorber is below the allowable current.

The above and other objects, effects, features and advantages of the present invention will become more apparent from the following description of the embodiment thereof taken in conjunction with the accompanying drawings.

BRIEF DESCRIPTION OF THE DRAWINGS

FIGS. 2(A)–2(E) comprise a time chart illustrating the operation of the conventional drive circuit of FIG. 1 in the first operation mode;

FIGS. 3(A)–3(E) comprise a time chart illustrating the operation of the conventional drive circuit of FIG. 1 in the second operation mode;

FIGS. 8(A)–8(H) comprise time chart illustrating the operation of the drive circuit of FIG. 7 in the first operation mode; and FIGS. 9A–9(H) comprise a time chart illustrating the operation of the drive circuit of FIG. 7 in the second operation mode.

DETAILED DESCRIPTION OF PREFERRED EMBODIMENT

The invention will now be described with reference to the accompanying drawings.

EMBODIMENT

Figure 1:
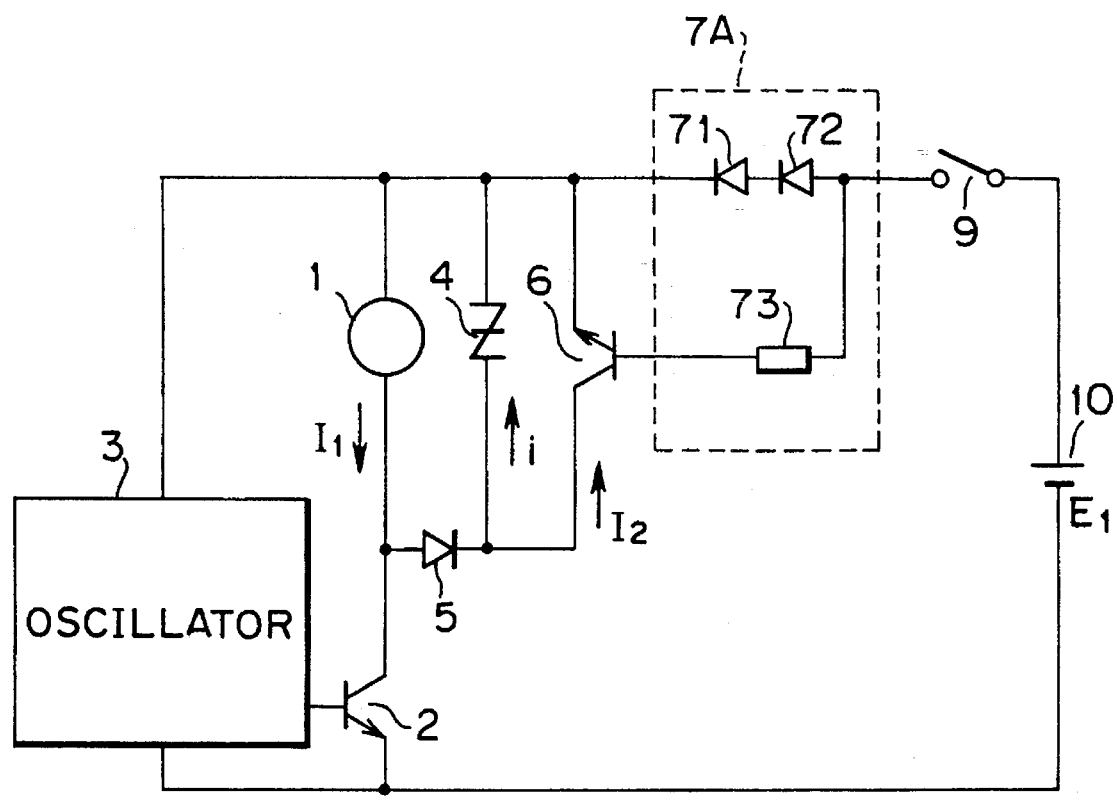
FIG. 1 is a circuit diagram showing a conventional drive circuit of an electromagnetic device.
Figure 4:
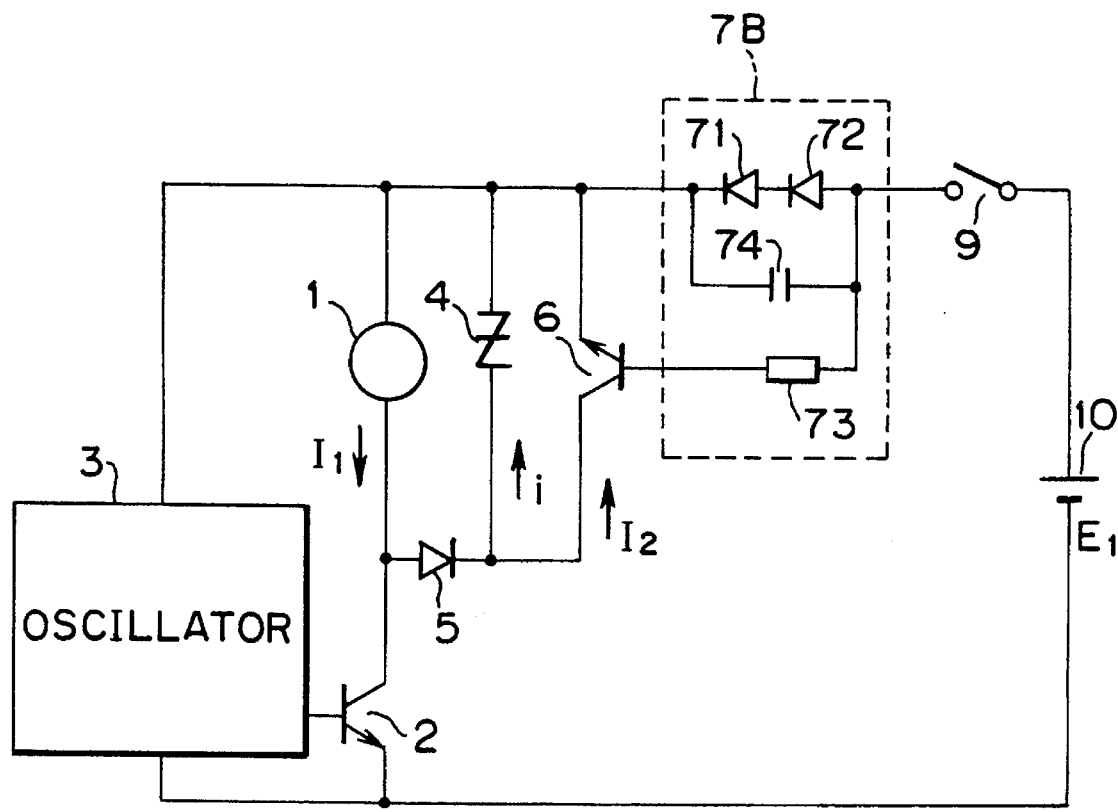
FIG. 4 is a circuit diagram showing another conventional drive circuit of an electromagnetic device.
Figure 7:
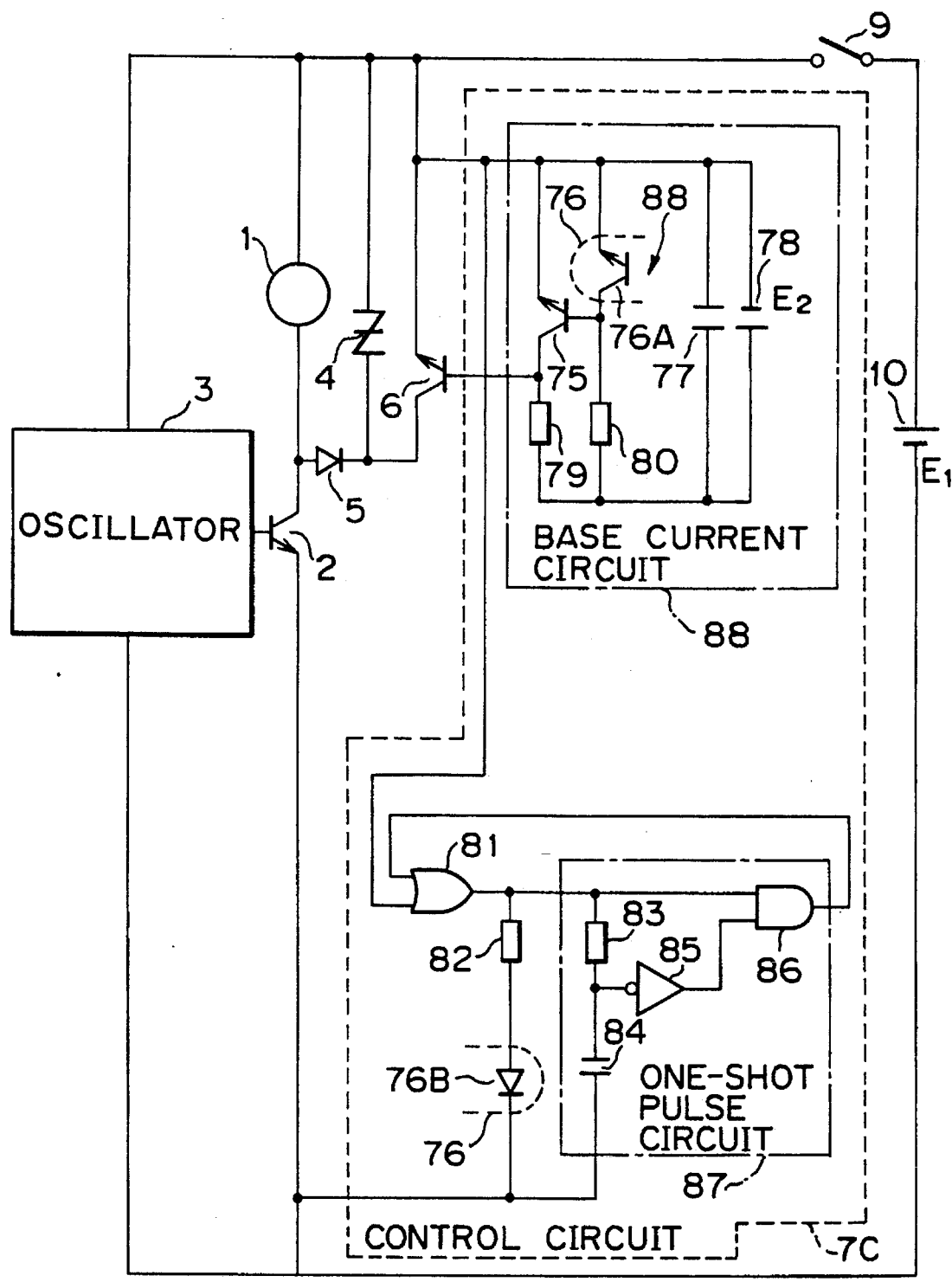
FIG. 7 is a circuit diagram showing an embodiment of a drive circuit of an electromagnetic device in accordance with the present invention.

FIG. 7 is a circuit diagram showing an embodiment of a drive circuit of an electromagnetic device in accordance with the present invention. The drive circuit of the electromagnetic device shown in FIG. 7 is provided with a control circuit 7C in place of the control circuits 7A and 7B of the conventional drive circuits as shown in FIGS. 1 and 4.

The control circuit 7C includes a base current circuit 88, an OR gate 81, a series circuit of a resistor 82 and a light emitting diode (LED) 76B of a photocoupler (optocoupler) 76, and a one-shot pulse circuit 87.

The base current circuit 88 includes a control transistor 75, a phototransistor 76A of a photocoupler 76, a capacitor 77, a control DC power supply 78, and resistors 79 and 80. The emitter of the control transistor 75 is connected to the negative terminal of the control DC power supply 78, and the collector thereof is connected to the base of the transistor 6, and to the positive terminal of the control DC power supply 78 via the resistor 79. The emitter of the phototransistor 76A is connected to the negative terminal of the control DC power supply 78, and the collector thereof is connected to the base of the control transistor 75, and to the positive terminal of the control DC power supply through the resistor 80. The capacitor 77 is connected in parallel with the control DC power supply 78, and functions as an impedance reduction capacitor of the control power supply 78.

The anode of the LED 76B is connected to the output terminal of the OR gate 81 through the resistor 82. The cathode of the LED 76B is connected to the emitter of the transistor 2. A first input terminal of the OR gate 81 is connected to the emitter of the transistor 6, and a second input terminal of the OR gate 81 is connected to the output terminal of an AND gate 86 of the one-shot pulse circuit 87.

The one-shot pulse circuit 87 is connected to the output terminal of the OR gate 81, and includes a series connection of a resistor 83 and a capacitor 84, an inverter 85, and the AND gate 86. The series connection of the resistor 83 and the capacitor 84 is connected to the output of the OR gate 81. The input terminal of the inverter 85 is connected to the connecting point of the resistor 83 and the capacitor 84. A first input terminal of the AND gate 86 is connected to the output terminal of the inverter 85, and a second input terminal of the AND gate 86 is connected to the output terminal of the OR gate 81.

The operation of the drive circuit of the electromagnetic device will now be described with reference to the timing charts shown in FIGS. 8 and 9.

Figure 5:
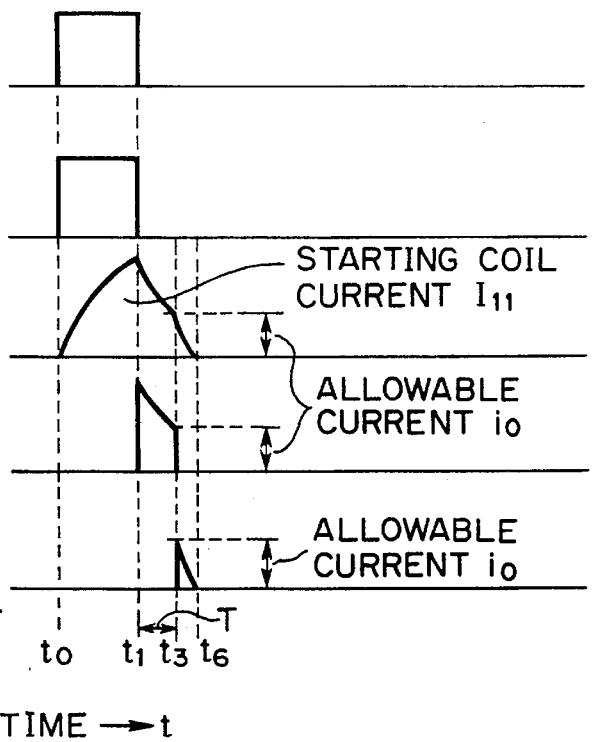
FIGS. 5(A)–5(E) comprise a time chart illustrating the operation of the conventional drive circuit of FIG. 4 in the first operation mode.
Figure 6:
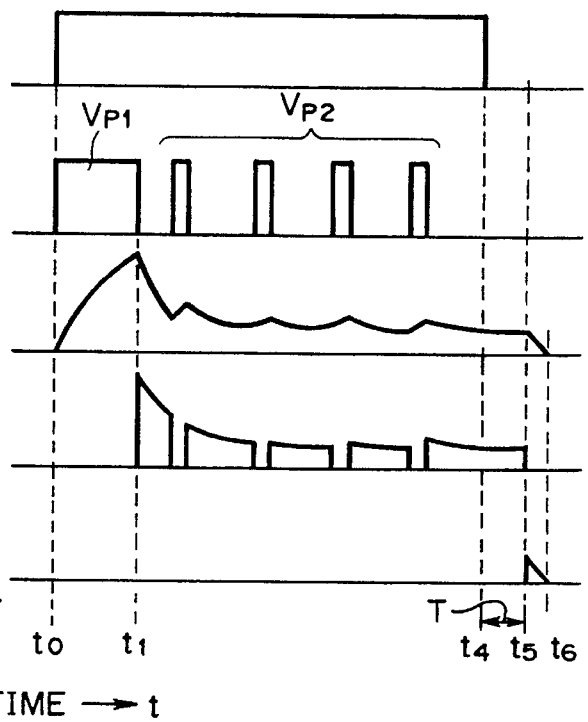
FIGS. 6(A)–6(E) comprise a time chart illustrating the operation of the conventional drive circuit of FIG. 4 in the second operation mode.

FIG. 8 illustrates the first mode operation of the embodiment. Specifically, it shows the operation when the switch 9 is closed at time $t_0$, and is opened again at time $t_1$ immediately after the wide width starting pulse $V_{pl}$ is applied from the oscillator 3 to the base of the transistor 2, as in FIGS. 2 and 5.

When the switch 9 is closed at time to as shown in FIG. 8(A), the voltage $E_1$ of the power supply 10 is applied to the coil 1, the oscillator 3, and the first input terminal of the OR gate 81. Accordingly, the oscillator 3 begins to generate the starting pulse as shown in FIG. 8(B).

The wide width starting pulse $V_{p1}$ generated by the oscillator 3 at time to is supplied to the base of the transistor 2 as shown in FIG. 8(B). This causes a rather large starting current $I_{11}$ flow through the coil 1 as shown in FIG. 8(F), and the contactor closes at time $t_1$.

At the same time $t_0$, an "H" (high level) signal is produced from the output terminal of the OR gate 81 as shown in FIG. 8(C). The LED 76B of the photocoupler 76 is caused to conduct by the "H" signal outputted from the OR gate 81, and the phototransistor 76A turns on. This turns off the control transistor 75, which in turn causes the transistor 6 to conduct.

The "H" signal outputted from the OR gate 81 at time $t_0$ is also applied to the second input terminal of the AND gate 86. At this time $t_0$, the first input terminal of the AND gate 86 is kept at the "H" level because the capacitor 84 has not yet charged, and hence, an "L" (low level) signal is applied to the input terminal of the inverter 85. Thus, the output of the inverter 85 is "H" level, and the AND gate 86 outputs an "H" signal as shown in of FIGS. 8(D) and (E). The output of the AND gate 86 is supplied to the second input terminal of the OR gate 81.

The capacitor 84, however, is being charged in accordance with the time constant determined by the resistor 83 and the capacitor 84, and the output of the inverter 85 falls to zero at time $t_2$ after time $t_1$. In other words, the delay time T from time $t_0$ to $t_2$ is determined by the time constant of the resistor 83 and the capacitor 84. When the output of the inverter 85 changes to "L" level at time $t_2$, the output of the AND gate 86 falls to "L" level as shown in FIG. 8(E). Thus, the AND gate 86 outputs a one-shot pulse whose width equals the delay time T.

Let us assume that the switch 9 is opened exactly at time $t_1$ because this gives the worst condition since the starting current $I_{11}$ becomes maximum at time $t_1$. In this case, although the first input terminal of the OR gate 81 falls to "L" level at time $t_1$, the second input terminal of the OR gate 81 is kept at the "H" level because time $t_1$ is present within the range of delay time T as shown in FIG. 8(E). The output of the OR gate 81 falls to "L" level at time $t_2$ as shown in FIG. 8(C). In other words, the output of the OR gate 81 is kept at the "H" level from time $t_0$ to time $t_2$ owing to the delay time T, and the transistor 6 is maintained conductive. Accordingly, the rather large starting coil current $I_{11}$ flows through the coil 1 and the transistor 6, and gradually attenuates owing to the resistance of the transistor 6. Thus, the starting coil current Ill drops below the allowable current $i_0$ of the surge absorber 4 from time $t_1$ to time $t_2$ as shown in FIG. 8(F). When the transistor 6 is turned off at time $t_2$, the starting coil current $I_{11}$ falls below the allowable current $i_0$ and its passage changes from the transistor 6 to the surge absorber 4, and flows through the surge absorber 4 as a current i as shown in FIG. 8(H). The current i quickly attenuates, and the contactor is opened at time $t_6$. This embodiment makes it possible to prevent a current greater than the allowable current $i_0$ from flowing through the surge absorber 4, thereby preventing overheating or burning of the surge absorber 4.

FIGS. 9(A)–9(H) illustrate the operation of the embodiment in the second operation mode as in FIGS. 6(A)–6(E). In this operation mode, the switch is opened at time $t_4$ after the coil current $I_1$ has fallen to a holding current.

The output of the AND gate 86 is kept at the "H" level during the delay time T from time $t_0$ to time $t_2$, and then falls to the "L" level at time $t_2$ as shown in of FIG. 9(E). The "L" level signal outputted from the AND gate 86 is applied to the second input terminal of the OR gate 81. The first input terminal of the OR gate 81, however, is kept at the "H" because the switch 9 is closed. Thus, the output of the OR gate 81 is kept at the "H" level until time $t_4$, at which time the switch 9 is opened as shown in FIG. 9(C). Accordingly, the LED 76B continues to emit light, and the phototransistor 76A keeps the on-state until time $t_4$. As a result, the control transistor 75 maintains the off-state, and the transistor 6 keeps the on-state.

When the switch 9 is opened at time $t_4$, the transistor 6 is turned off instantly because the output of the OR gate 81 falls to "L" level at time $t_4$, the phototransistor 76A is turned off, and the control transistor 75 is turned on. Therefore, the holding current $I_2$ of the coil 1, which is below the allowable current $i_0$ of the surge absorber 4, begins to flow through the surge absorber 4 at time $t_4$ as the current i. The current i quickly attenuates, and the contactor is opened at time $t_6$ immediately after time $t_4$. Thus, the contactor is opened without delay in the second mode.

The present invention has been described in detail with respect to various embodiment, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A drive circuit of an electromagnetic device having a coil, a loop circuit including a DC power supply, a switch, and a first switching device, said drive circuit further comprising:

an oscillator having an output terminal connected to a control terminal of said first switching device, said oscillator providing said first switching device with a starting pulse and holding pulses following the starting pulse, said starting pulse being generated when the switch is closed, the width of said starting pulse being greater than the width of said holding pulses;

a series circuit including a surge absorber and a diode, said series circuit being connected in parallel with said coil in such a direction that said series circuit absorbs a counter electromotive force of said coil;

a second switching device connected in parallel with said surge absorber; and a control circuit, said control circuit (1) rendering said second switching device conductive during a predetermined delay time after the switch is closed, and (2) making said second switching device instantly non-conductive when said switch is opened after said predetermined delay time has elapsed, said predetermined delay time being longer than the width of the starting pulse.

2. The drive circuit of an electromagnetic device as claimed in claim 1, wherein said first switching device is a first transistor, and said control terminal of said first switching device is a base of said first transistor.

3. The drive circuit of an electromagnetic device as claimed in claim 2, wherein said second switching device is a second transistor, and said control circuit comprises:

a one-shot pulse circuit generating a pulse in response to a closing of the switch, the width of said pulse being substantially equal to said predetermined delay time;

an OR gate ORing the output of said one-shot pulse circuit and a signal representing the on-state of said switch; and a base current circuit controlling said second transistor in response to an output signal of said OR gate, said base current circuit turning off said second transistor after said predetermined delay time has elapsed when said switch is opened during said predetermined delay time, and turning off said second transistor immediately after said switch is opened when said switch is opened after said predetermined delay time.

4. The drive circuit of an electromagnetic device as claimed in claim 3, wherein said control circuit comprises a photocoupler having a light emitting diode connected to the output of said OR gate via a resistor, and wherein a phototransistor, which receives light from the light emitting diode, is included in said base current circuit.

5. The drive circuit of an electromagnetic device as claimed in claim 4, wherein a collector of said first transistor is connected to said coil and an emitter of said first transistor is connected to a negative terminal of said DC power supply, and a collector of said second transistor is connected to the collector of said first transistor through said diode and an emitter of said second transistor is connected to a positive terminal of said DC power supply via said switch.

6. The drive circuit of an electromagnetic device as claimed in claim 5, wherein said base current circuit comprises:

a third transistor having an emitter connected to the emitter of said second transistor and having a collector connected to the base of said second transistor;

a control DC power supply having a negative terminal connected to the emitter of said third transistor, and a positive terminal connected to the collectors of said third transistor and said phototransistor via respective resistors; and a capacitor connected between the positive terminal and the negative terminal of said control DC power supply, wherein an emitter of said phototransistor is connected to the emitter of said third transistor and the collector of said phototransistor is connected to a base of said third transistor.

7. The drive circuit of an electromagnetic device as claimed in claim 6, wherein said one-shot pulse circuit comprises:

a series circuit including a resistor and a capacitor, said series circuit being connected to the output of said OR gate;

an inverter having an input terminal connected to a connecting point of said resistor and capacitor of said series circuit; and an AND gate having a first input terminal connected to an output terminal of said OR gate and a second input terminal connected to an output terminal of said inverter, said AND gate producing the output of said one-shot pulse circuit.

* * * * *